United States Patent [19]

Watts

[11] 4,252,169
[45] Feb. 24, 1981

[54] TIRE SIDEWALL PROTECTION SHIELD

[75] Inventor: George T. Watts, North Canton, Ohio

[73] Assignee: The Goodyear Tire & Rubber Company, Akron, Ohio

[21] Appl. No.: 57,780

[22] Filed: Jul. 16, 1979

[51] Int. Cl.³ .............................................. B60C 19/00
[52] U.S. Cl. .................................. 152/186; 152/154; 152/DIG. 1; 280/156
[58] Field of Search ............... 152/154, 185, 186, 189, 152/170, 174, 190, 242, 365, DIG. 1, 177; 280/156; 301/37 ST, 37 TC

[56] References Cited

U.S. PATENT DOCUMENTS

| 967,806 | 8/1910 | Meyer | 152/186 |
|---|---|---|---|
| 1,140,778 | 5/1915 | Trigalet | 152/185 |
| 1,235,251 | 7/1917 | Self | 280/156 |
| 1,867,518 | 7/1932 | Maclean et al. | 152/154 |
| 1,905,674 | 4/1933 | Babbs | 152/154 |
| 3,187,797 | 6/1965 | Fletcher et al. | 152/154 |

FOREIGN PATENT DOCUMENTS

| 31403 | 2/1923 | Denmark | 280/156 |
|---|---|---|---|
| 34858 | 8/1925 | Denmark | 280/156 |
| 7981 | 2/1980 | European Pat. Off. . | |

OTHER PUBLICATIONS

WO 79/00425, 7/1979, "Tire Sidewall Protector for Multi-Piece Rim Wheels", Shiffler, et al.

Primary Examiner—Michael G. Wityshyn
Attorney, Agent, or Firm—D. M. Ronyak

[57] ABSTRACT

A removable resilient shield is maintained proximate the sidewalls of a tire for off-the-road vehicles to protect this critical area of the tire from damage due to contact with external objects such as rocks. The shield is attached to the rim flange. The radially inner portion of the shield is discontinuous to prevent accumulation of debris between the shield and the sidewall of a tire mounted on the rim.

5 Claims, 4 Drawing Figures

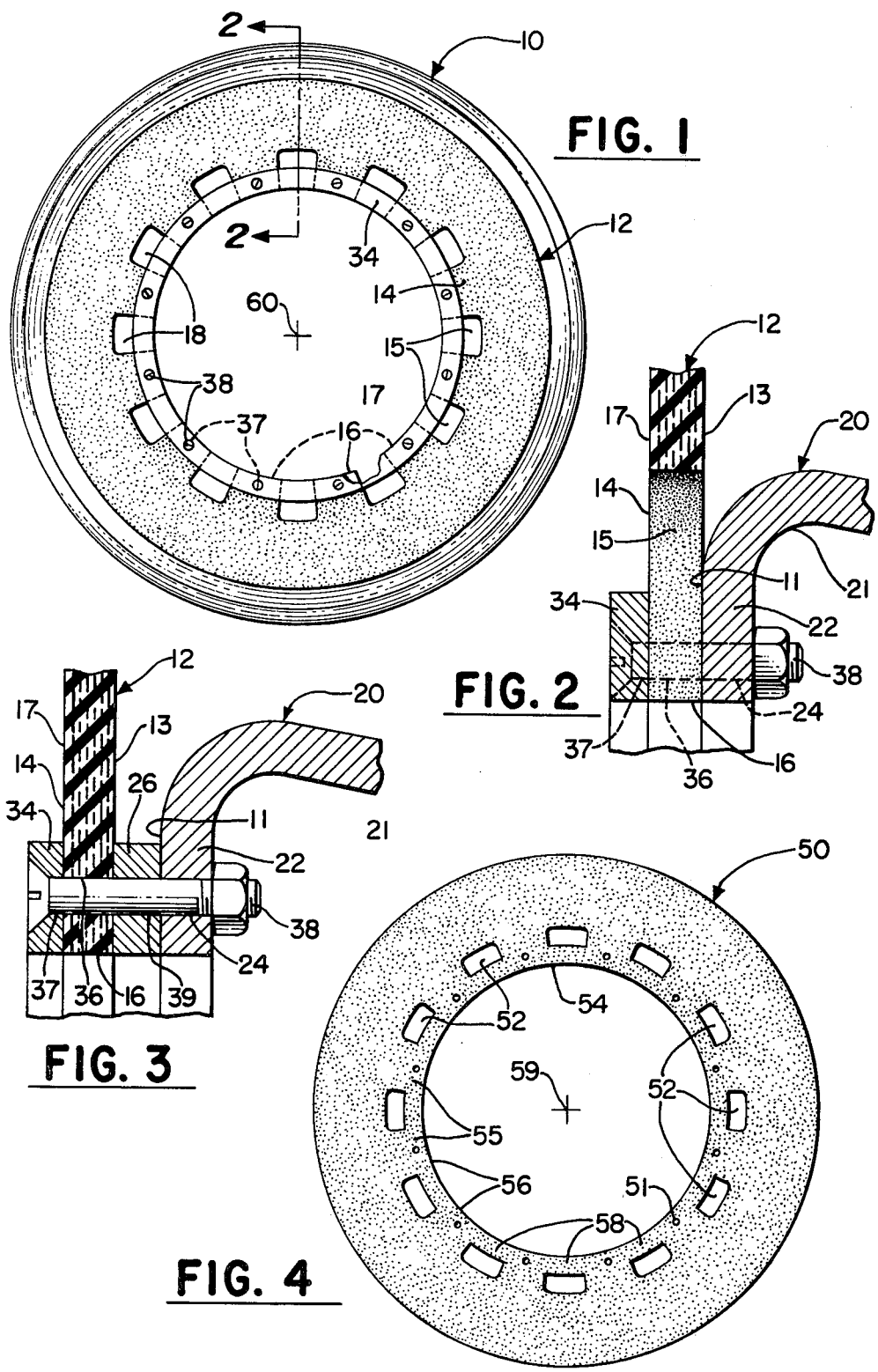

TIRE SIDEWALL PROTECTION SHIELD

The foregoing abstract is not to be taken as limiting the invention of this application and in order to understand the full nature and extent of the technical disclosure of this application reference must be made to the accompanying drawings and the following detailed description.

This invention relates to protection of the sidewalls of vehicle tires which operate off the road. In such tires the sidewalls are particularly vulnerable to damage from sharply pointed rocks or other material which the tire is likely to encounter as it rolls over rough terrain for which off-the-road type vehicles are designed to operate.

The invention may be used with any tire; however, it is most useful with a tire whose service conditions are such as to cause failure of the tire through damage to the tire sidewalls from contact with external objects. The invention is particularly well suited to the protection of one or both of the lower or radially inner portion of the sidewalls of large off-the-road type tires and especially those of a design which includes a replaceable tread or traction belt, which are more vulnerable to sidewall damage due to their increased service life. It may be used in conjunction with an upper sidewall protection device, an example of which is shown in U.S. Pat. No. 4,030,530. The inventin may be used with any tire for which protection is required.

Past efforts for the protection of the sidewall of a tire have included a resilient shield fastened adjacent the tread of a tire. The shield in some instances has been extended from its attachment point adjacent the tread of the tire to the tire rim flange where the shield was also secured. A sectional annular shield has been attached to the rim flange by means of a plurality of removable fasteners circumferentially spaced about the rim flange, the shield being retained between the rim flange and ring segments by the removable fastening means.

It is believed that none of the prior art devices have been entirely satisfactory for protection of the lower or radially inner sidewall of a tire intended for off-the-road operation. Some of the prior art protection devices are laborious to assemble. Some of the prior art protection devices may be easily damaged or knocked off the tire and rim assembly when the shield or attachment devices used therewith receive a blow which causes sufficient deformation. Additionally, the prior art tire sidewall protection devices have positioned the radially inner portion of the shield adjacent the tire sidewall and rim flange such that dirt, sand and other debris may become entrapped between the rim, the tire sidewall and the shield. Accumulation of debris in this area may result in damage to the tire sidewall during continued operation of the tire due to abrasion of the tire sidewall.

SUMMARY OF THE INVENTION

It is an object of the invention to provide a tire sidewall protection shield which reduces or eliminates entrapment of debris between the protection shield and associated sidewall of the tire.

It is another object of the invention to provide a tire sidewall protection shield which is not readily dislodged upon impact with an obstacle during operation of the vehicle upon which the protection shield is mounted.

These and other objects and advantages of the invention will become apparent as the description proceeds.

An annular tire sidewall protection shield is removably attached to a tire rim. The tire rim includes a tire-supporting flange axially spaced of its centerplane. The tire rim terminates in a portion directed generally radially inwardly toward the axis of rotation of the rim. Preferably the terminal portion of the rim includes a plurality of generally axially directed apertures spaced apart about its circumference. An annular resilient shield axially engages said terminal portion of the rim. The radially inner portion of the shield is discontinuous to permit egress of debris from between the sidewall of a tire mounted on the rim and the shield. The radially inner portion of the shield may include a plurality of generally radially inwardly directed tabs. Alternatively, near its radially inner portion of the shield may include a plurality of aperatures. The shield extends radially outwardly of the axis of rotation of the tire rim from a radius corresponding to that of the terminal portion of the rim. The shield is interposed between an annular ring and the terminal portion of the rim. The ring includes a plurality of apertures extending generally in an axial direction therethrough. The apertures of the ring are spaced apart about the circumference of the ring. The apertures of the components are aligned and removable fastening means extend through the aligned apertures of the shield and ring in a generally axial direction to secure the shield and ring to the terminal portion of the rim.

Alternatively, a spacer such as a plurality of blocks or a second annular ring is positioned between the terminal portion of the rim and the shield.

BRIEF DESCRIPTION OF THE DRAWINGS

In the Drawings:

FIG. 1 is a side elevatin of a tire and rim assembly having mounted thereon a sidewall protection shield according to the invention.

FIG. 2 is an enlarged fragmentary sectional view taken along line 2—2 of FIG. 1.

FIG. 3 is an enlarged fragmentary sectional view illustrating another embodiment of a sidewall protection shield assembly according to the invention.

FIG. 4 is a side elevation of another embodiment of a sidewall protection shield according to the invention.

DETAILED DESCRIPTION OF THE INVENTION

Referring now to the figures and particularly to FIG. 1, an annular tire sidewall protection shield 12 is removably secured to the flange 21 of a tire rim 20. The shield 12 covers at least the radially innermost portion or lower sidewall portion of tire 10. The tire rim 20 includes a pair of tire supporting flanges (not illustrated) axially spaced from its centerplane. As used herein, the centerplane (not illustrated) of the rim 20 is a plane perpendicularly intersecting the axis of rotation 60 of the rim and being located midway between the axially spaced tire supporting flanges of the rim. Referring to FIGS. 2 and 3, the flange 21 of tire rim 20 includes a terminal portion 22 directed generally radially inwardly toward the axis of rotation 60 of the rim 20. Preferably, as shown, the terminal portion 22 of the rim flange 21 includes a plurality of generally axially directed apertures 24 spaced apart about its circumference for receipt of a plurality of generally axially extending fasteners (such as typified by bolt and nut 38). As used herein "axially" and related forms mean in a direction generally parallel to the axis of rotation of the respective shield, rim, tire or assembly of a shield and rim. The axis of rotation 59 of the shield 50 is shown in FIG. 4.

The shield 12 is positioned axially outboard of the terminal portion 22 of the rim flange 21. As used herein, an item which is "axially inboard" of another is nearer to the centerplane of the respective tire rim or tire rim and protection shield assembly. Conversely, an item which is "axially outboard" of another is farther away from the centerplane of the respective tire rim or tire rim and protection shield assembly.

The shield 12 is an annular protective body of resilient sheet material for absorbing impact from rocks and other debris. The shield 12 may be formed of sections (not illustrated) for example, by cutting and piecing together slabs of elastomeric material to form a disc with its center removed. Preferably however, the shield 12 is circumferentially continuous to avoid the need for fasteners which may become broken or snagged during operation of the assembly in its normally harsh environment. The shield 12 may be formed of reinforced elastomeric material, for example, textile and/or wire reinforced rubber or a resilient plastic such as polyurethane. The shield 12 may be retained by frictional forces by compressing the shield between the terminal portion 22 of the rim flange and an annular ring 34 as illustrated in FIG. 2. Alternatively, the shield may be fastened to the rim flange and interposed between a pair of annular rings (not illustrated), or between a plurality of spacer blocks 26 and an annular ring 34 as shown in FIG. 3. The ring 34 and spacer blocks 26 are typically made of a metal such as steel. The shield 12 preferably includes a plurality of generally axially extending apertures 36 which are circumferentially spaced apart about its radially inner portion 14 in alignment with corresponding apertures (37,39) in the corresponding rings and spacers. The shield 12 extends radially outwardly of the axis of rotation of the tire rim 20 from a radius corresponding to that of the rim flange terminal portion 22. Typically, the maximum radial extent of the shield 12 is an amount greater than the radius of the tire 10 protected thereby at the point of maximum axial dimension of the tire.

The radially inner portion 14 of the shield 12 is discontinuous. These disconintuities 18 in the radially inner portion 14 of the shield 12 may include a plurality of circumferentially spaced apart radially inwardly directed projections or tabs 16 as shown in FIGS. 1—3. Alternatively, as shown in FIG. 4, the shield 50 may include a plurality of apertures 52 circumferentially spaced apart near its radially innermost end 54. Apertures 52 are of a size greater than needed for passage of fastening means such as bolts 38 therethrough and preferably, are in addition to apertures 51 provided for passage of fastening means. For purposes of illustration the apertures 52 each have a perimeter formed of radially directed line segments joined by one or more circumferentially directed arcuate segments. This, however, need not be the case and all alternate configurations are within contemplation of the invention. For example only, the discontinuities may appear to be a series of circumferentially spaced polygons, circles or other geometric figures. What is important is that the discontinuities when the shield is installed form apertures (numeral 15 in FIG. 1 or numeral 52 in FIG. 4) to permit egress of the debris from between the shield and a tire sidewall protected thereby. The embodiment shown in FIG. 4 can also be described as including a plurality of radially inwardly directed tabs 55 which are joined at their radially inward ends 56 by a plurality of circumferentially extending tie-bars 58 to define apertures 52.

As shown in FIG. 2 the shield 12 may be positioned so as to directly abut the rim flange terminal portion 22. The axially inboard surface 13 of the shield 12 is in contact with the axially outboard surface 11 of the rim flange terminal portion 22. Axially outboard of the shield 12 there is positioned an annular ring 34 which directly abuts the shield 12. Annular ring 34, shield 12 and the rim flange terminal portion 22 each contain a plurality of circumferentially spaced generally axially directed apertures in alignment. A plurality of removable fasteners (as typified by bolt and nut 38) extend therethrough to bind the components together. Thus, the shield 12 is interposed between the rim flange 21 and annular ring 34. Preferably the fasteners are recessed or present a flush surface with ring 34 to prevent snagging of the assembly.

Alternatively, as shown in FIG. 3, a plurality of spacer blocks 26 may be positioned about the circumference of the rim flange terminal portion 22 so as to position the shield 12 in axially spaced relationship to the terminal portion 22 of the rim flange. Because the spacer blocks 26 are not continuous in the circumferential direction of the ring, there is created a plurality of radially directed holes or apertures at circumferentially spaced apart postions through which debris contained between the tire sidewall and the sidewall protection shield 12 can exit. The spacing means may be a radially slotted ring (not illustrated), separate blocks 26 or comprise a sack of ordinary flat washers (not illustrated). Preferably the spacers are permanently fastened or integral with one of the other components such as terminal portion 22 or shield 12 of the assembly. Each spacer block 26 includes an aperture 39 passing therethrough in a generally axial direction for receipt of one of the fastening means 38. Engaging the axially outboard surface 17 of the sidewall protection shield 12, is an annular ring 34 similar to that described with reference to FIG. 2. The use and function of spacer means such as blocks 26 are further described in co-pending application Ser. No. 057,227, of R J Olsen et al, entitled Tire Sidewall Protector Shield Assembly, and commonly assigned herewith, and filed on July 13, 1979.

As used herein, "radially", "radially directed" and related forms mean in a direction which is towards or away from the axis of rotation of the respective shield, tire rim or the tire rim and protection shield assembly, the direction being within a radial plane of the respective shield, tire rim or tire rim and protection shield assembly. As used herein a "radial plane" of the respective shield, tire rim or the tire rim and protection shield assembly is one which passes through and contains the axis of rotation of the respective shield, tire rim or the tire rim and protection shield assembly.

The manner of attachment of the tire sidewall protection shield to the terminal portion of the rim flange is fully described in the above-referenced co-pending application of Olsen, et al. The disclosure therein is hereby incorporated by reference.

Although the tire rim and protection shown and described includes a shield for one sidewall of a tire, it is understood that both sidewalls of a tire may be protected in like manner.

The shield has been shown and described as being attached to a terminal portion of the flange of a single component rim. It is understood that when a multipiece rim is employed, one of the rim components may, of course, be formed so as to provide an equivalent mounting site for the protection shield.

While certain representative embodiments in detail have been shown for the purpose of illustrating the invention it will be apparent to those skilled in this art that various changes and modifications may be made therein without departing from the spirit or scope of the invention.

I claim:

1. A tire rim and protection shield assembly comprising:
   (a) a tire rim having a tire-supporting flange axially spaced from the centerplane of the rim;
   (b) a resilient shield fastened to said flange and extending radially outwardly from a position adjacent said flange;
   (c) said shield being an annular body of reinforced resilient elastomeric material having a radially innermost portion which is discontinuous in the circumferential direction of the shield and provides at least one passage extending through said shield for removal of debris accumulating between said rim and said shield during operation; and
   (d) spacing means fastened to said rim flange, said spacing means being interposed between said rim flange and said sheild, said spacing means having an opening providing at least one radially extending passage between said rim and said shield for removal of debris accumulating during operation.

2. The assembly of claim 1, wherein said innermost portion includes a plurality of radially inwardly projecting tabs spaced apart from one another in the circumferential direction of the shield.

3. The assembly of claim 2, wherein said tabs are joined at their radially innermost ends by a plurality of integral circumferentially extending tie-bars to define a plurality of passages spaced apart from one another in the circumferential direction of the shield for removal of debris accumulating between said rim and said shield during operation.

4. The assembly of claim 1, 2, or 3, further comprising an annular ring fastened to said rim flange, said shield being interposed between said rim flange and said ring.

5. The assembly of claim 4, wherein said spacing means include a plurality of blocks spaced apart from one another about the circumference of said rim flange.

* * * * *